(12) United States Patent     (10) Patent No.:   US 12,688,415 B2

Pillai et al.                      (45) Date of Patent:       Jul. 21, 2026

(54) PHYSICS-INFORMED NEURAL NETWORK FOR INVERSELY PREDICTING EFFECTIVE MATERIAL PROPERTIES OF METAMATERIALS

(71) Applicant: Tata Consultancy Services Limited, Mumbai (IN)

(72) Inventors: Prajith Pillai, Bangalore (IN); Anirban Chaudhuri, Bangalore (IN); Parama Pal, Bangalore (IN); Beena Rai, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 877 days.

(21) Appl. No.: 17/970,710

(22) Filed: Oct. 21, 2022

(65) Prior Publication Data

US 2023/0177327 A1     Jun. 8, 2023

(30) Foreign Application Priority Data

Dec. 6, 2021    (IN)  .............................. 202121056631

(51) Int. Cl.
     *G06N 3/08*         (2023.01)
(52) U.S. Cl.
     CPC ..................................... *G06N 3/08* (2013.01)
(58) Field of Classification Search
     CPC .......... G06N 3/08; G06N 3/048; G06N 3/042; G06N 3/09; G06F 2113/08; G06F 30/23; G06F 30/28; G06F 30/27
     See application file for complete search history.

(56) References Cited

U.S. PATENT DOCUMENTS

| | | | |
|---|---|---|---|
| 2018/0166062 A1* | 6/2018 | Hoffberg | ........... G10K 11/1785 |
| 2023/0071046 A1* | 3/2023 | Pestourie | .............. G06N 20/00 |

OTHER PUBLICATIONS

Chen et al., "Physics-informed neural networks for inverse problems in nano-optics and metamaterials," (2020).
Fang et al., "Deep Physical Informed Neural Networks for Metamaterial Design," Digital Object Identifier (2020).
Hou et al., "Prediction Network of Metamaterial with Split Ring Resonator Based on Deep Learning," Nanoscale Research Letters, 15:83 (2020).

* cited by examiner

*Primary Examiner* — Matthew Ell
*Assistant Examiner* — Jonathan J Kim
(74) *Attorney, Agent, or Firm* — Finnegan, Henderson, Farabow, Garrett & Dunner, LLP

(57)              ABSTRACT

Conventionally, design methodologies employed deep learning model based on physics which considers only real (permittivity) term and ignores the imaginary (conductivity) term in complex loss function which fail to help in design of complex structures and limit their applications to scenarios such as array of metamaterial structures. Present application provides systems and method implement apply a Physics-Informed Neural Network (PINN) for inversely calculating the effective material parameters of a multi-dimensional metamaterial from its scattered field(s). By employing a loss function based on the Helmholtz wave equation, performance of a metamaterial is modeled by the system the dependance of resonant behavior on the homogenized electric permittivity distribution profile generated by the PINN is demonstrated.

12 Claims, 10 Drawing Sheets

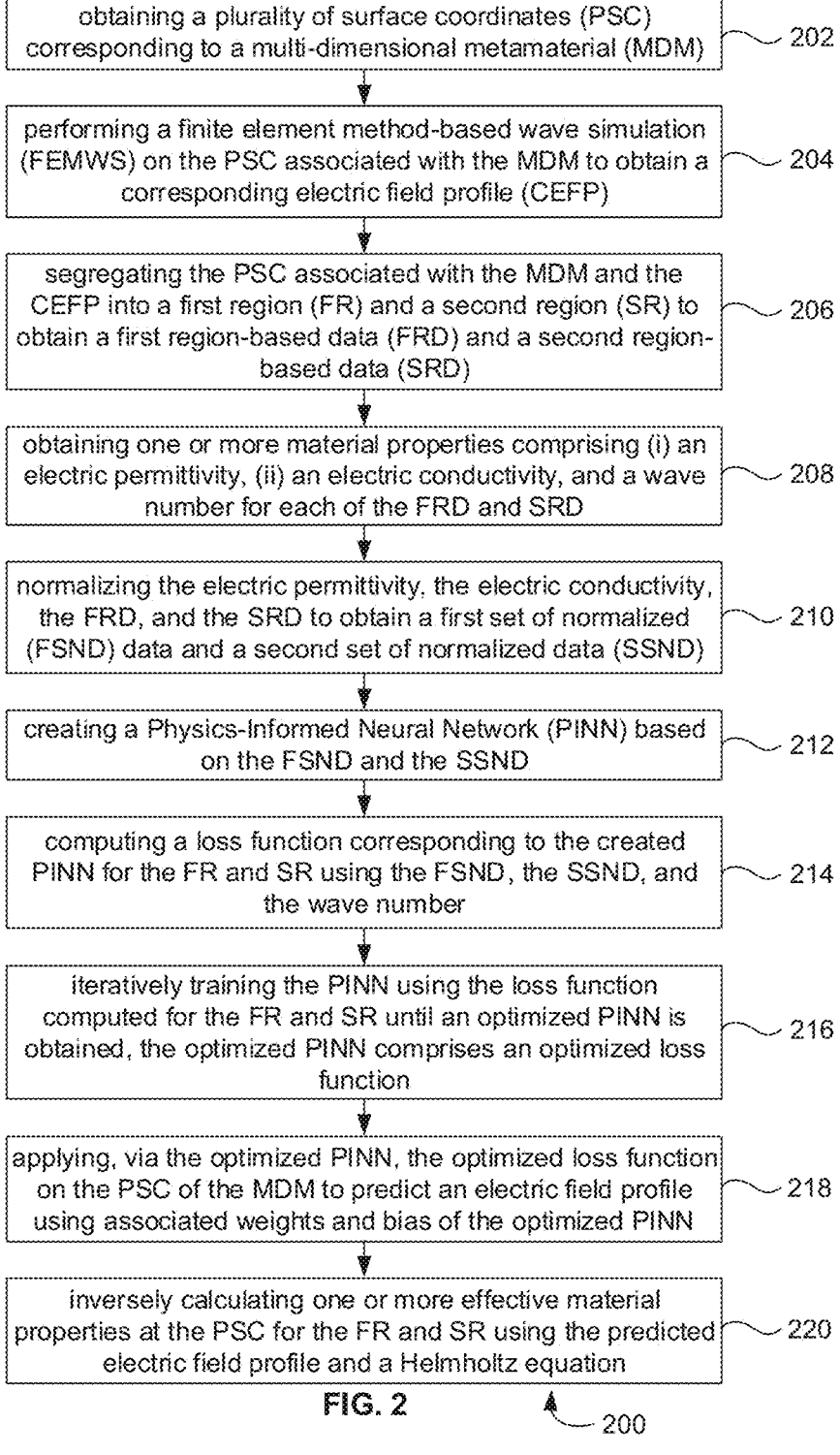

obtaining a plurality of surface coordinates (PSC) corresponding to a multi-dimensional metamaterial (MDM) ⌐∼ 202 performing a finite element method-based wave simulation (FEMWS) on the PSC associated with the MDM to obtain a corresponding electric field profile (CEFP) ⌐∼ 204 segregating the PSC associated with the MDM and the CEFP into a first region (FR) and a second region (SR) to obtain a first region-based data (FRD) and a second region-based data (SRD) ⌐∼ 206 obtaining one or more material properties comprising (i) an electric permittivity, (ii) an electric conductivity, and a wave number for each of the FRD and SRD ⌐∼ 208 normalizing the electric permittivity, the electric conductivity, the FRD, and the SRD to obtain a first set of normalized (FSND) data and a second set of normalized data (SSND) ⌐∼ 210 creating a Physics-Informed Neural Network (PINN) based on the FSND and the SSND ⌐∼ 212 computing a loss function corresponding to the created PINN for the FR and SR using the FSND, the SSND, and the wave number ⌐∼ 214 iteratively training the PINN using the loss function computed for the FR and SR until an optimized PINN is obtained, the optimized PINN comprises an optimized loss function ⌐∼ 216 applying, via the optimized PINN, the optimized loss function on the PSC of the MDM to predict an electric field profile using associated weights and bias of the optimized PINN ⌐∼ 218 inversely calculating one or more effective material properties at the PSC for the FR and SR using the predicted electric field profile and a Helmholtz equation ⌐∼ 220

FIG. 2    ↑∼ 200

PHYSICS-INFORMED NEURAL NETWORK FOR INVERSELY PREDICTING EFFECTIVE MATERIAL PROPERTIES OF METAMATERIALS

PRIORITY CLAIM

This U.S. patent application claims priority under 35 U.S.C. § 119 to: Indian Patent Application No. 202121056631, filed on Dec. 6, 2021. The entire contents of the aforementioned application are incorporated herein by reference.

TECHNICAL FIELD

The disclosure herein generally relates to prediction of metamaterial properties, and, more particularly, to physics-informed neural network for inversely predicting effective material properties of metamaterials.

BACKGROUND

Metamaterials (or 'metasurfaces' in the planar case) are artificially engineered composites that demonstrate highly controllable manipulation of electromagnetic fields resulting in electromagnetic responses that are not achievable in naturally occurring materials. These metamaterials comprise of building blocks with dimensions that are much smaller than the interacting wavelength(s) and can therefore, be considered as effectively homogeneous materials whose performance is dictated by the artificially structured unit cells or 'meta-atoms' rather than the fundamental properties of the constituent materials, resulting in novel phenomenon such as negative refraction, cloaking effects, and sub-diffraction imaging. In recent years, an impressive body of research had successfully established data-driven design and optimization models based on deep learning for deriving the complex, and often non-intuitive, relationships between metamaterials and their response(s), which are dictated primarily by Maxwell's equations for electromagnetics. A recent paradigm for tackling inverse problems in electromagnetics, typically the retrieval of structural and material properties that lead to a target response, are physics-informed neural networks (PINNs), which is an indirectly supervised learning framework for solving partial differential equations using limited sets of training data.

Currently, all available design tools (commercial software/open-source tools) rely heavily on the intuition and knowledge base/domain awareness of the end user. This results in multiple, lengthy iterations to arrive at the design of choice. Further, there is an absence of a holistic framework for design of mesoscale meta structures properties for custom electric field distribution.

SUMMARY

Embodiments of the present disclosure present technological improvements as solutions to one or more of the above-mentioned technical problems recognized by the inventors in conventional systems. For example, in one aspect, there is provided a processor implemented method for physics-informed neural network for inversely predicting effective material properties of metamaterials. The method comprises: obtaining, via one or more hardware processors, an input comprising a plurality of surface coordinates corresponding to a multi-dimensional metamaterial; performing, via the one or more hardware processors, a finite element method-based wave simulation (FEMWS) on the plurality of surface coordinates associated with the multi-dimensional metamaterial to obtain a corresponding electric field profile; segregating, via the one or more hardware processors, the plurality of surface coordinates associated with the multi-dimensional metamaterial and the corresponding simulated electric field profile into a first region and a second region to obtain a first region-based data and a second region-based data; obtaining, via the one or more hardware processors, one or more material properties comprising (i) an electric permittivity, (ii) an electric conductivity, and a wave number for each of the first region-based data and the second region-based data; normalizing, via the one or more hardware processors, the electric permittivity, the electric conductivity, and the first region-based data and the second region-based data to obtain a first set of normalized data and a second set of normalized data; creating, via the one or more hardware processors, a Physics-Informed Neural Network (PINN) based on the first set of normalized data and the second set of normalized data; computing, via the one or more hardware processors, a loss function corresponding to the created PINN for each of the first region and the second region using the first set of normalized data and a second set of normalized data and the wave number; iteratively training, via the one or more hardware processors, the PINN using the loss function computed for each of the first region and the second region until an optimized PINN is obtained, wherein the optimized PINN comprises an optimized loss function; applying, via the optimized PINN, the optimized loss function on the plurality of surface coordinates of the multi-dimensional metamaterial to predict an electric field profile using associated weights and bias of the optimized Physics-Informed Neural Network (PINN); and inversely calculating, via the one or more hardware processors, one or more effective material properties at the plurality of surface coordinates for the first region and the second region using the predicted electric field profile and a Helmholtz equation.

In an embodiment, the first region and the second region are different from each other.

In an embodiment, the plurality of surface coordinates obtained from the first set of normalized data and the second set of normalized data serves as one or more inputs corresponding to one or more input layers of the PINN.

In an embodiment, the corresponding electric field from the first set of normalized data and the second set of normalized data serves as an output corresponding to an output layer of the PINN.

In an embodiment, the one or more effective material properties comprise at least one of an effective electric permittivity and an effective electric conductivity.

In an embodiment, the method further comprises computing an average effective material property based on the one or more effective material properties calculated for the first region and the second region; simulating, via the finite element method-based wave simulation (FEMWS), the average effective material property to obtain a simulated electric field profile; and performing a comparison of (i) the simulated electric field profile, and (ii) the corresponding electric field profile; and validating the simulated electric field profile based on the comparison.

In an embodiment, the loss function for the first region is computed using an expression:

$$\nabla \times \nabla \times E(x, y) + k_0^2 \varepsilon_r(x, y) E(x, y) - j k_0 \sigma(x, y) E(x, y) = 0,$$

E is the corresponding electric field profile, x and y are the plurality of surface coordinates, $k_0$ is the wave number, $\varepsilon_r$ is the electric permittivity, $\sigma$ is the electric conductivity, and j is a complex conjugate.

In an embodiment, the loss function for the second region is computed using an expression:

$$\nabla \times \nabla \times E(x, y) + k_0^2 \varepsilon_r(x, y)E(x, y) = 0,$$

E is the corresponding electric field profile, x and y are the plurality of surface coordinates, $k_0$ is the wave number, $\varepsilon_r$ is the electric permittivity, and $\sigma$ is the electric conductivity.

In another aspect, there is provided a processor implemented system for physics-informed neural network for inversely predicting effective material properties of meta-materials The system comprises: a memory storing instructions; one or more communication interfaces; and one or more hardware processors coupled to the memory via the one or more communication interfaces, wherein the one or more hardware processors are configured by the instructions to: obtain an input comprising a plurality of surface coordinates corresponding to a multi-dimensional metamaterial; perform a finite element method-based wave simulation (FEMWS) on the plurality of surface coordinates associated with the multi-dimensional metamaterial to obtain a corresponding electric field profile; segregate the plurality of surface coordinates associated with the multi-dimensional metamaterial and the corresponding simulated electric field profile into a first region and a second region to obtain a first region-based data and a second region-based data; obtain one or more material properties comprising (i) an electric permittivity, (ii) an electric conductivity, and a wave number for each of the first region-based data and the second region-based data; normalize the electric permittivity, the electric conductivity, the first region-based data, and the second region-based data to obtain a first set of normalized data and a second set of normalized data; create a Physics-Informed Neural Network (PINN) based on the first set of normalized data and the second set of normalized data; compute a loss function corresponding to the created PINN for each of the first region and the second region using the first set of normalized data and a second set of normalized data and the wave number; iteratively train the PINN using the loss function computed for each of the first region and the second region until an optimized PINN is obtained, wherein the optimized PINN comprises an optimized loss function; apply, via the optimized PINN, the optimized loss function on the plurality of surface coordinates of the multi-dimensional metamaterial to predict an electric field profile using associated weights and bias of the optimized PINN; and inversely calculate one or more effective material properties at the plurality of surface coordinates for the first region and the second region using the predicted electric field profile and a Helmholtz equation.

In an embodiment, the first region and the second region are different from each other.

In an embodiment, the plurality of surface coordinates obtained from the first set of normalized data and the second set of normalized data serves as one or more inputs corresponding to one or more input layers of the PINN.

In an embodiment, the corresponding electric field from the first set of normalized data and the second set of normalized data serves as an output corresponding to an output layer of the PINN.

In an embodiment, the one or more effective material properties comprise at least one of an effective electric permittivity and an effective electric conductivity.

In an embodiment, the one or more hardware processors are further configured by the instructions to compute an average effective material property based on the one or more effective material properties calculated for the first region and the second region; simulate, via the finite element method-based wave simulation (FEMWS), the average effective material property to obtain a simulated electric field profile; and perform a comparison of (i) the simulated electric field profile, and (ii) the corresponding electric field profile; and validate the simulated electric field profile based on the comparison.

In an embodiment, the loss function for the first region is computed using an expression:

$$\nabla \times \nabla \times E(x, y) + k_0^2 \varepsilon_r(x, y)E(x, y) - jk_0\sigma(x, y)E(x, y) = 0,$$

E is the corresponding electric field profile, x and y are the plurality of surface coordinates, $k_0$ is the wave number, $\varepsilon_r$ is the electric permittivity, $\sigma$ is the electric conductivity, and j is a complex conjugate.

In an embodiment, the loss function for the second region is computed using an expression:

$$\nabla \times \nabla \times E(x, y) + k_0^2 \varepsilon_r(x, y)E(x, y) = 0,$$

E is the corresponding electric field profile, x and y are the plurality of surface coordinates, $k_0$ is the wave number, $\varepsilon_r$ is the electric permittivity, and $\sigma$ is the electric conductivity.

In yet another aspect, there are provided one or more non-transitory machine-readable information storage mediums comprising one or more instructions which when executed by one or more hardware processors cause a method for physics-informed neural network for inversely predicting effective material properties of metamaterials. The method comprises: obtaining, via one or more hardware processors, an input comprising a plurality of surface coordinates corresponding to a multi-dimensional metamaterial; performing, via the one or more hardware processors, a finite element method-based wave simulation (FEMWS) on the plurality of surface coordinates associated with the multi-dimensional metamaterial to obtain a corresponding electric field profile; segregating, via the one or more hardware processors, the plurality of surface coordinates associated with the multi-dimensional metamaterial and the corresponding simulated electric field profile into a first region and a second region to obtain a first region-based data and a second region-based data; obtaining, via the one or more hardware processors, one or more material properties comprising (i) an electric permittivity, (ii) an electric conductivity, and a wave number for each of the first region-based data and the second region-based data; normalizing, via the one or more hardware processors, the electric permittivity, the electric conductivity, and the first region-based data and the second region-based data to obtain a first set of normalized data and a second set of normalized data; creating, via the one or more hardware processors, a Physics-Informed Neural Network (PINN) based on the first set of normalized data and the second set of normalized data; computing, via the one or more hardware processors, a loss function corresponding to the created PINN for each of the first region and the second region using the first set of normalized data and a second set of normalized data and the wave number; iteratively training, via the one or more hardware processors, the PINN using the loss function computed for each of the first region and the second region until an optimized PINN is obtained, wherein the optimized PINN comprises an optimized loss function; applying, via the optimized PINN, the optimized loss function on the plurality of surface coordinates of the multi-dimensional metamaterial to predict an electric field profile using associated weights and bias of the optimized PINN; and inversely calculating, via the one or more hardware processors, one or more effective material properties at the plurality of surface coordinates for the first region and the second region using the predicted electric field profile and a Helmholtz equation.

In an embodiment, the first region and the second region are different from each other.

In an embodiment, the plurality of surface coordinates obtained from the first set of normalized data and the second set of normalized data serves as one or more inputs corresponding to one or more input layers of the PINN.

In an embodiment, the corresponding electric field from the first set of normalized data and the second set of normalized data serves as an output corresponding to an output layer of the PINN.

In an embodiment, the one or more effective material properties comprise at least one of an effective electric permittivity and an effective electric conductivity.

In an embodiment, the method further comprises computing an average effective material property based on the one or more effective material properties calculated for the first region and the second region; simulating, via the finite element method-based wave simulation (FEMWS), the average effective material property to obtain a simulated electric field profile; and performing a comparison of (i) the simulated electric field profile, and (ii) the corresponding electric field profile; and validating the simulated electric field profile based on the comparison.

In an embodiment, the loss function for the first region is computed using an expression:

$$\nabla \times \nabla \times E(x, y) + k_0^2 \varepsilon_r(x, y)E(x, y) - jk_0\sigma(x, y)E(x, y) = 0,$$

E is the corresponding electric field profile, x and y are the plurality of surface coordinates, $k_0$ is the wave number, $\varepsilon_r$ is the electric permittivity, $\sigma$ is the electric conductivity, and j is a complex conjugate.

In an embodiment, the loss function for the second region is computed using an expression:

$$\nabla \times \nabla \times E(x, y) + k_0^2 \varepsilon_r(x, y)E(x, y) = 0,$$

E is the corresponding electric field profile, x and y are the plurality of surface coordinates, $k_0$ is the wave number, $\varepsilon_r$ is the electric permittivity, and $\sigma$ is the electric conductivity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 depicts an exemplary flow chart illustrating a method for physics-informed neural network for inversely predicting effective material properties of metamaterials, using the system of FIG. 1, in accordance with an embodiment of the present disclosure.

DETAILED DESCRIPTION

Figure 1:
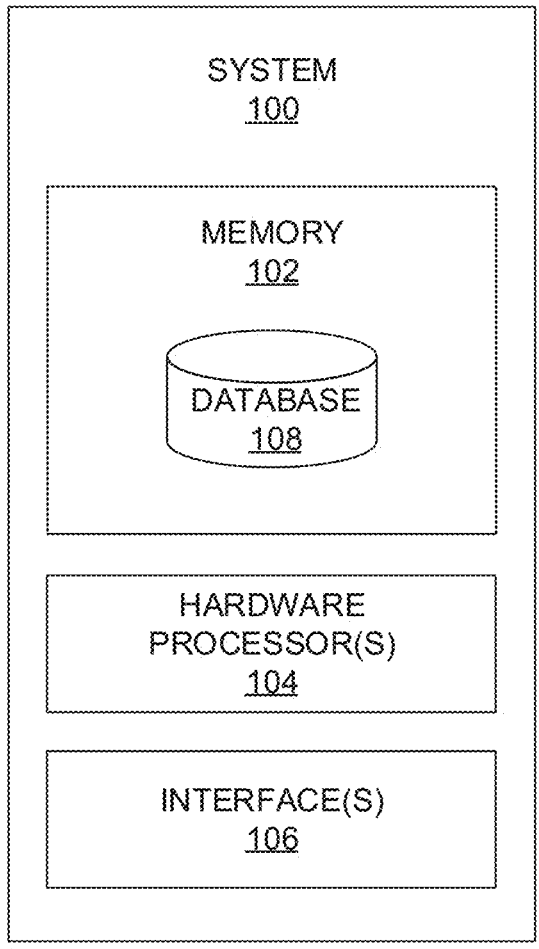
FIG. 1 depicts an exemplary system for physics-informed neural network for inversely predicting effective material properties of metamaterials, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned above, metamaterials (or 'metasurfaces' in the planar case or mesoscale materials) are materials whose fundamental structural unit (or unit cell) has dimensions on spatial scales beyond atomic/molecular scales and exhibit behaviour that is strongly influenced by its structure and material properties. These metamaterials are artificially engineered composites that demonstrate highly controllable manipulation of electromagnetic fields resulting in electromagnetic responses that are not achievable in naturally occurring materials. Data-driven design and optimization models have been established by researchers based on deep learning for deriving the complex, and often non-intuitive, relationships between metamaterials and their response(s), which are dictated primarily by Maxwell's equations for electromagnetics. A recent paradigm for tackling inverse problems in electromagnetics, typically the retrieval of structural and material properties that lead to a target response, are Physics-Informed Neural Networks (PINNs), which is an indirectly supervised learning framework for solving partial differential equations using limited sets of training data.

Currently, all available design tools (commercial software/open-source tools) rely heavily on the intuition and knowledge base/domain awareness of the end user. This results in multiple, lengthy iterations to arrive at the design of choice. Further, there is an absence of a holistic framework for design of mesoscale meta structures properties for custom electric field distribution.

Furthermore, existing design methodologies employ deep learning model based on physics which takes into account only real (permittivity) term and ignores the imaginary (conductivity) term in complex loss function. These also require the usage of binary classification input for effectively distinguishing the material regions on the surface. These also fail to help in design of complex structures like split ring resonator and limited to scenarios such as array of metamaterial structures.

Some of the limitation of traditional methodologies include:

1. Lack in providing an approach apart from convolutional neural network which uses electric field distribution.
2. The ability to allow to accept a manually defined electric field profile from the user and seek a suitable structure property for said electric field distribution.
3. Lack of the ability to scan multidimensional parameter spaces (feature geometries, EM field profiles, electric and magnetic field resonances) in order to provide an optimal solution.

In the present disclosure, embodiments herein provide systems and method that implement Physics-Informed Neural Network(s) (PINNs) for 'homogenizing' two distinct meta-atom designs, namely a disc and a split-ring resonator (SRR) by inversely predicting their effective electric permittivity distributions from simulated scattered electric field(s). Homogenization simply means the resultant electric fields are identical to those scattered by a hypothetical continuous medium with the same effective material properties, in line with well-established 'effective medium theory'. SRRs are essentially oscillators formed by a combination of an inductive element (the ring) and a capacitive element (a split or gap region in the ring). When the split-ring is in resonance with the frequency of the incident light, large local fields are observed in the gap region. The parameter that dictates this local field enhancement is the effective electric permittivity coefficient of these non-magnetic metamaterials. The system and method of the present disclosure demonstrate the effect of the accuracy of the PINN-based inverse model on the nature of the SRR's complex, resonant behaviour.

Say, 'D' denotes the input design with material properties specified and 'IR' is the electric field distribution at resonance of the design, then the system and method of the present disclosure predicts the effective permittivity of the materials constituting the design. The system of the present disclosure implements PINN as mentioned above wherein the PINN learns based on the minimization of loss which is based on the residue of Helmholtz partial differential equation. In other words, the system/PINN of the present disclosure predicts the design (D) material properties from the electric field response (R).

Referring now to the drawings, and more particularly to FIGS. 1 through 12C, where similar reference characters denote corresponding features consistently throughout the figures, there are shown preferred embodiments and these embodiments are described in the context of the following exemplary system and/or method.

FIG. 1 depicts an exemplary system 100 for physics-informed neural network for inversely predicting effective material properties of metamaterials, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises a plurality of surface coordinates (PSR) corresponding to one or more multi-dimensional metamaterials (MDM), simulated data (e.g., corresponding electric field profile (CEFP) of the multi-dimensional metamaterials), segregated data (e.g., PSR and CEFP into various regions—also referred as region based data), material properties (e.g., electric permittivity and electric conductivity of the MDMs), wave number (also referred as free space wave number and interchangeably used herein), normalized data (e.g., normalized electric permittivity, normalized electric conductivity, normalized region based data, and the like), loss function (e.g., real loss function component, and imaginary/complex loss function component for each of the regions), optimized loss function(s), predicted electric field profile, one or more effective material properties being computed for the MDMs. The database 108 further comprises (i) various techniques such as one or more finite element method-based wave simulation (FEMWS) technique(s), (ii) various network(s) such as one or more Physics-Informed Neural Networks (PINN (or PINNs)), one or more optimized PINNs, and the like, (iii) various equations/expressions such as Helmholtz equation(s), loss function equation(s)/expressions, average effective material property(ies), simulated electric field profile(s), validation-based simulated electric field profile(s), and the like. In an embodiment, the one or more Physics-Informed Neural Networks may also be referred as one or more Physics Informed Neural Networks and interchangeably used herein. The above-mentioned various technique(s), various network (s), and the like, which when executed enable the system 100 to perform the method of the present disclosure. Further, the above-mentioned various equations/expression(s) which when solved enable the system 100 to perform the method of the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method 200 for physics-informed neural network for inversely predicting effective material properties of metamaterials, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2, and other diagrams and graphical representations depicted in FIGS. 3 through 12C.

Figure 3:
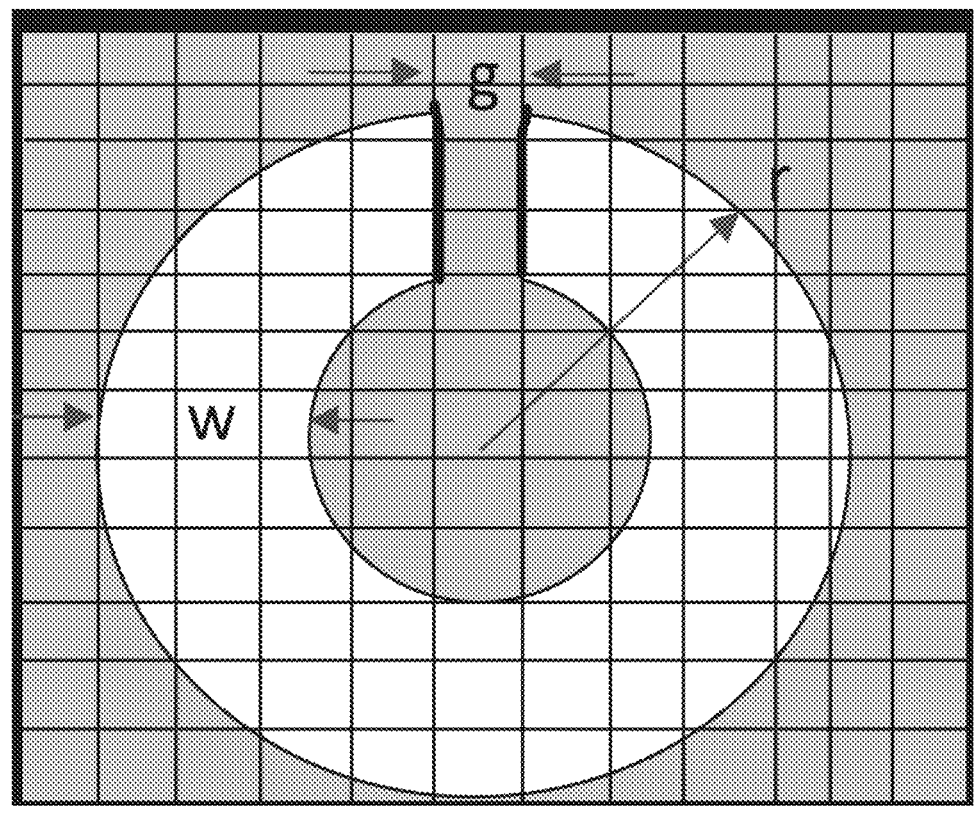
FIG. 3 depicts a multi-dimensional metamaterial, in accordance with an embodiment of the present disclosure.

In an embodiment, at step 202 of the present disclosure, the one or more hardware processors 104 obtain an input comprising a plurality of surface coordinates (also referred as PSC or coordinates or surface coordinates and interchangeably used herein) corresponding to a multi-dimensional metamaterial (MDM). The multi-dimensional metamaterial is depicted in FIG. 3. More specifically, FIG. 3, with reference to FIGS. 1-2, depicts a multi-dimensional metamaterial, in accordance with an embodiment of the present disclosure. The surface coordinates (PSC) are generated during a preprocessing stage of meshing while using a finite element solver (a finite element method analysis as known in the art). The mesh grid point data are collected as coordinates. The surface coordinates are described in below Table 1 in conjunction with step 204.

Figure 4:
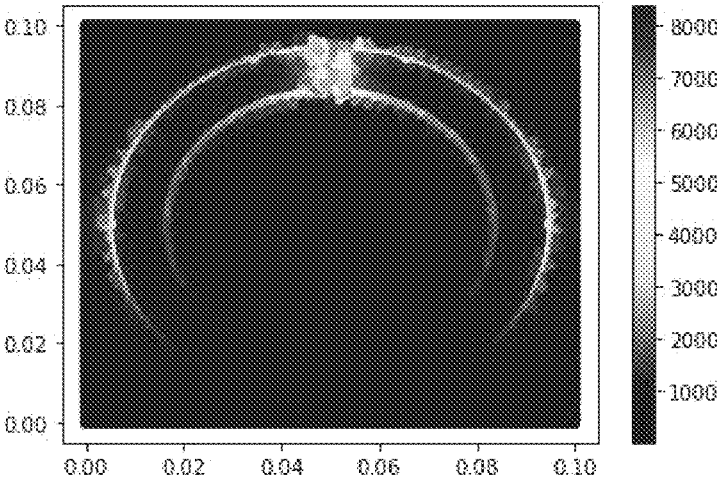
FIG. 4 depicts a corresponding electric field profile for the multi-dimensional metamaterial, in accordance with an embodiment of the present disclosure.

In an embodiment, at step 204 of the present disclosure, the one or more hardware processors 104 perform a finite element method-based wave simulation (FEMWS) on the plurality of surface coordinates (PSC) associated with the multi-dimensional metamaterial to obtain a corresponding electric field profile. Post simulation using electromagnetic (EM) wave. The electric field profile values for these grid points are collected and tabulated with coordinates. FIG. 4, with reference to FIGS. 1 through 3, depicts a corresponding electric field profile for the multi-dimensional metamaterial, in accordance with an embodiment of the present disclosure. The electric field generation is governed by a Helmholtz equation, in an embodiment of the present disclosure. The electric field profile values are obtained as a function of (x, y) coordinates as described in the Helmholtz equation. Below Table 1 illustrates exemplary values of surface coordinates and a corresponding electric field profile E.

TABLE 1

| x | y | Electric field profile (E) |
|---|---|---|
| 0.010186 | 0.029028 | 2088.057616 |
| 0.009737 | 0.028225 | 2058.172185 |
| 0.00933 | 0.028997 | 1933.117402 |
| 0.0106 | 0.02826 | 2046.503234 |

It is to be noted and understood by a person having ordinary skill in the art or person skilled in the art that there could be 3 or more surface coordinates (e.g., x, y, and z) whereas the above Table 1 depicts two (2) surface coordinates (x, y). Therefore, a third coordinate z may also be obtained by the system 100 of the present disclosure. In an embodiment of the present disclosure, value of the third coordinate z may be obtained as 0.05. The tabulated data for network is obtained by FEM electromagnetic wave simulation using COMSOL software tool, in an embodiment of the present disclosure. The coordinates (x, y, and z) from mesh and corresponding electric field is acquired post the simulation as mentioned above. It is to be understood by a person having ordinary skill in the art or person skilled in the art that use of COMSOL software tool shall not be construed as limiting the scope of the present disclosure.

Figure 5:
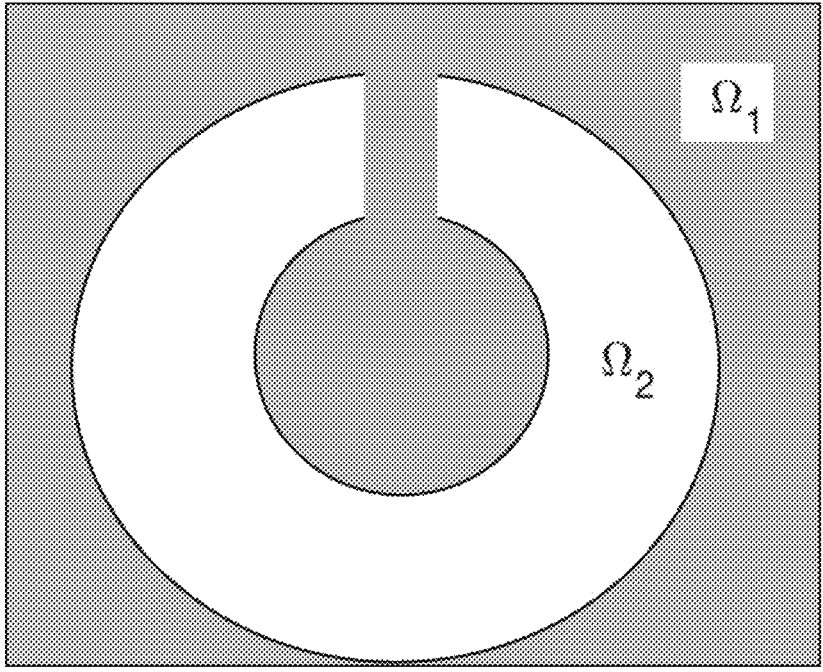
FIG. 5 depicts a first region and a second region of the multi-dimensional metamaterial, in accordance with an embodiment of the present disclosure.

In an embodiment, at step 206 of the present disclosure, the one or more hardware processors 104 segregate the plurality of surface coordinates (PSC) associated with the multi-dimensional metamaterial and the corresponding simulated electric field profile into a first region (FR) and a second region (SR) to obtain a first region-based data (FRD) and a second region-based data (SRD). In an embodiment, the first region (FR) and the second region (SR) are different from each other. For instance, the first region refers to a ring region of the multi-dimensional metamaterial, in an embodiment of the present disclosure. The second region refers to a non-ring region of the multi-dimensional metamaterial, in an embodiment of the present disclosure. In an embodiment, the ring region and the non-ring region may be similar or identical to each other. The acquired data (e.g., Table 1) is separated to ring and non-ring region wherein inner and outer radius of the ring are calculated and points in that region are collected, in one embodiment of the present disclosure. The ring region $\Omega_2$ and non-ring region $\Omega_1$ are depicted in FIG. 5. More specifically, FIG. 5, with reference to FIGS. 1 through 4, depicts a first region and a second region of the multi-dimensional metamaterial, in accordance with an embodiment of the present disclosure.

In an embodiment, at step 208 of the present disclosure, the one or more hardware processors 104 obtain one or more material properties comprising (i) an electric permittivity, (ii) an electric conductivity, and a wave number for each of the first region-based data (FRD) and the second region-based data (SRD). The electrical permittivity, electric conductivity are material properties that are pre-fed to FEM solver for EM simulation. The wave number corresponds to the resonant frequency of the structure (or the multi-dimensional metamaterial). In conjunction to steps 206 and 208, the first region-based data (ring region $\Omega_2$) and the second region-based data (non-ring region $\Omega_1$) along with (i) the electric permittivity, (ii) the electric conductivity, and the wave number are depicted in Tables 2 and 3 respectively. More specifically, Table 2 illustrates the first region-based data (ring region $\Omega_2$) and corresponding electric permittivity, electric conductivity, and the wave number. Table 3 illustrates the second region-based data (non-ring region $\Omega_1$) and corresponding electric permittivity, electric conductivity, and the wave number.

TABLE 2

| | | | | First region-based data (ring region $\Omega_2$) | | | |
|---|---|---|---|---|---|---|---|
| | x | y | z | Electric field profile | Electric permittivity | wave number | Electric conductivity |
| 1 | 0.010186 | 0.029028 | 0.05 | 2088.057616 | 1 | 4.717 | 35600000 |
| 2 | 0.0106 | 0.02826 | 0.05 | 2046.503234 | 1 | 4.717 | 35600000 |
| 3 | 0.009787 | 0.029804 | 0.05 | 2049.10107 | 1 | 4.717 | 35600000 |

TABLE 3

| | | | | Second region-based data (non-ring region $\Omega_1$) | | | |
|---|---|---|---|---|---|---|---|
| | x | y | z | Electric field profile | Electric permittivity | wave number | Electric conductivity |
| 1 | 0.096842 | 0.083761 | 0.05 | 363.2697408 | 11.9 | 4.717 | 0 |
| 2 | 0.096835 | 0.084591 | 0.05 | 349.5097773 | 11.9 | 4.717 | 0 |
| 3 | 0.096075 | 0.084197 | 0.05 | 361.6661859 | 11.9 | 4.717 | 0 |

In an embodiment, at step 210 of the present disclosure, the one or more hardware processors 104 normalize the electric permittivity, the electric conductivity, the first region-based data, and the second region-based data to obtain a first set of normalized data (FSND) and a second set of normalized data (SSND). Owing to the difference in scale of the input and output the complete data (coordinates), electric field profile, permittivity, conductivity) are normalized before feeding to a network. The normalization helps in bringing the complete data to a same vector space. Below Tables 4 and 5 depict the first set of normalized data (ring region $\Omega_2$) and the second set of normalized data (non-ring region $\Omega_1$) respectively.

TABLE 4

| | | | | First region-based data (ring region $\Omega_2$) | | | |
|---|---|---|---|---|---|---|---|
| | Normalized x | Normalized y | Normalized z | Normalized Electric field profile | Normalized Electric permittivity | Normalized wave number | Normalized Electric conductivity |
| 1 | 0.09737 | 0.282251 | 1 | 0.245905 | 1 | 4.717 | 0 |
| 2 | 0.093304 | 0.289971 | 1 | 0.230964 | 1 | 4.717 | 0 |
| 3 | 0.101586 | 0.274611 | 1 | 0.226344 | 1 | 4.717 | 0 |

TABLE 5

| | | | | Second region-based data (non-ring region $\Omega_1$) | | | |
|---|---|---|---|---|---|---|---|
| | Normalized x | Normalized y | Normalized z | Normalized Electric field profile | Normalized Electric permittivity | Normalized wave number | Normalized Electric conductivity |
| 1 | 0.101858 | 0.29028 | 1 | 0.249476 | 0 | 4.717 | 1 |
| 2 | 0.10599 | 0.2826 | 1 | 0.244511 | 0 | 4.717 | 1 |
| 3 | 0.097865 | 0.29804 | 1 | 0.244821 | 0 | 4.717 | 1 |

Figure 6:
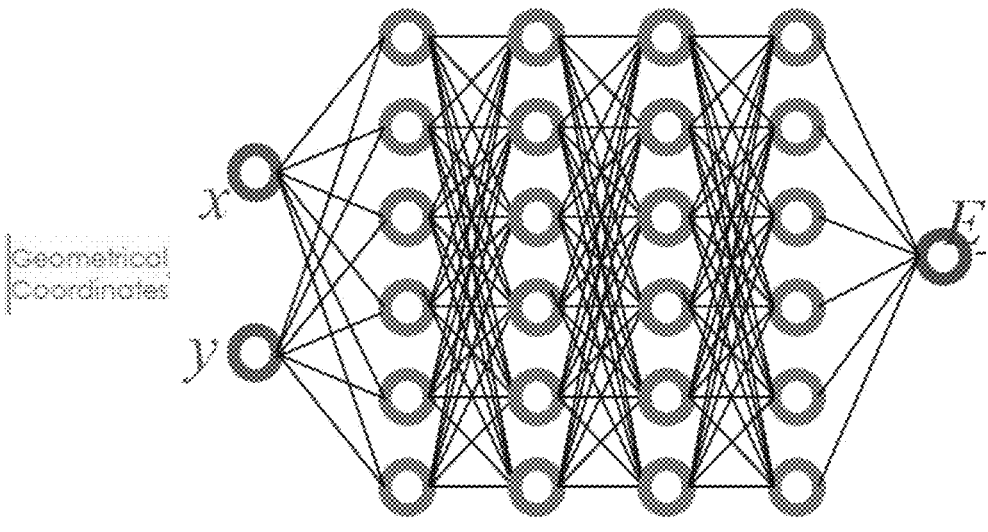
FIG. 6 depicts a Physics-Informed Neural Network (PINN) created based on a first set of normalized data and a second set of normalized data, in accordance with an embodiment of the present disclosure.

In an embodiment, at step 212 of the present disclosure, the one or more hardware processors 104 create a Physics-Informed Neural Network (PINN) based on the first set of normalized data (FSND) and the second set of normalized data (SSND). The plurality of surface coordinates (PSC) obtained from the first set of normalized data (FSND) and the second set of normalized data (SSND) serves as one or more inputs corresponding to one or more input layers of the Physics-Informed Neural Network (PINN). In other words, the plurality of surface coordinates (PSC) is fed as input to the input layers of the PINN. The corresponding electric field from the first set of normalized data and the second set of normalized data serves as an output corresponding to an output layer of the PINN. In other words, the corresponding electric field is the output of the output layer comprised in the PINN. FIG. 6, with reference to FIGS. 1 through 5, depicts the Physics-Informed Neural Network (PINN) created based on the first set of normalized data and the second set of normalized data, in accordance with an embodiment of the present disclosure. The surface coordinates x and y are fed as inputs to the input layers of the PINN and Electric field profile E serves as an output of the output layer of the PINN as depicted in FIG. 6. The Physics-Informed Neural Network architecture (Deep Neural Network/PINN) is developed/created with two (x, y) or three inputs (x, y, and z) and one output (Electric field profile E). The PINN consists of 4 hidden layers with 250 neurons each, in an embodiment of the present disclosure and such architecture shall not be construed as limiting the scope of the present disclosure. The weights and biases are initialized using Glorot uniform initialization. Adam optimizer with learning rate of 1e-4 is used. $\sin(\pi \ast x)$ activation function is used in intermediate layer, in an embodiment of the present disclosure.

In an embodiment, at step 214 of the present disclosure, the one or more hardware processors 104 compute a loss function corresponding to the created PINN for each of the first region and the second region using the first set of normalized data and a second set of normalized data and the wave number.

In an embodiment, the loss function for the first region (ring region $\Omega_2$) is computed using an expression:

$$\nabla \times \nabla \times E(x, y) + k_0^2 \varepsilon_r(x, y) E(x, y) - jk_0 \sigma(x, y) E(x, y) = 0$$

x and y are the plurality of surface coordinates, E is the corresponding electric field profile for the plurality of surface coordinates x and y, $k_0$ is the wave number, $\varepsilon_r$ is the electric permittivity for the plurality of surface coordinates x and y, and $\sigma$ is the electric conductivity for the plurality of surface coordinates x and y, and j is a complex conjugate. As mentioned above, if 3 coordinates are obtained for the multi-dimensional metamaterial, then the above expression can be re-written to incorporate the z coordinate as below:

$$\nabla \times \nabla \times E(x, y, z) + k_0^2 \varepsilon_r(x, y, z) E(x, y, z) - jk_0 \sigma(x, y, z) E(x, y, z) = 0$$

In an embodiment, the loss function for the second region (non-ring region $\Omega_1$) is computed using an expression:

$$\nabla \times \nabla \times E(x, y) + k_0^2 \varepsilon_r(x, y) E(x, y) = 0,$$

x and y are the plurality of surface coordinates, E is the corresponding electric field profile for the plurality of surface coordinates x and y, $k_0$ is the wave number, $\varepsilon_r$ is the electric permittivity for the plurality of surface coordinates x and y, and $\sigma$ is the electric conductivity for the plurality of surface coordinates x and y. As mentioned above, if 3 coordinates are obtained for the multi-dimensional metamaterial, then the above expression can be re-written to incorporate the z coordinate as below:

$$\nabla \times \nabla \times E(x, y, z) + k_0^2 \varepsilon_r(x, y, z) E(x, y, z) = 0$$

In an embodiment, at step 216 of the present disclosure, the one or more hardware processors 104 iteratively train the PINN using the loss function computed for each of the first region and the second region until an optimized PINN is obtained, wherein the optimized PINN comprises an optimized loss function.

Figure 7:
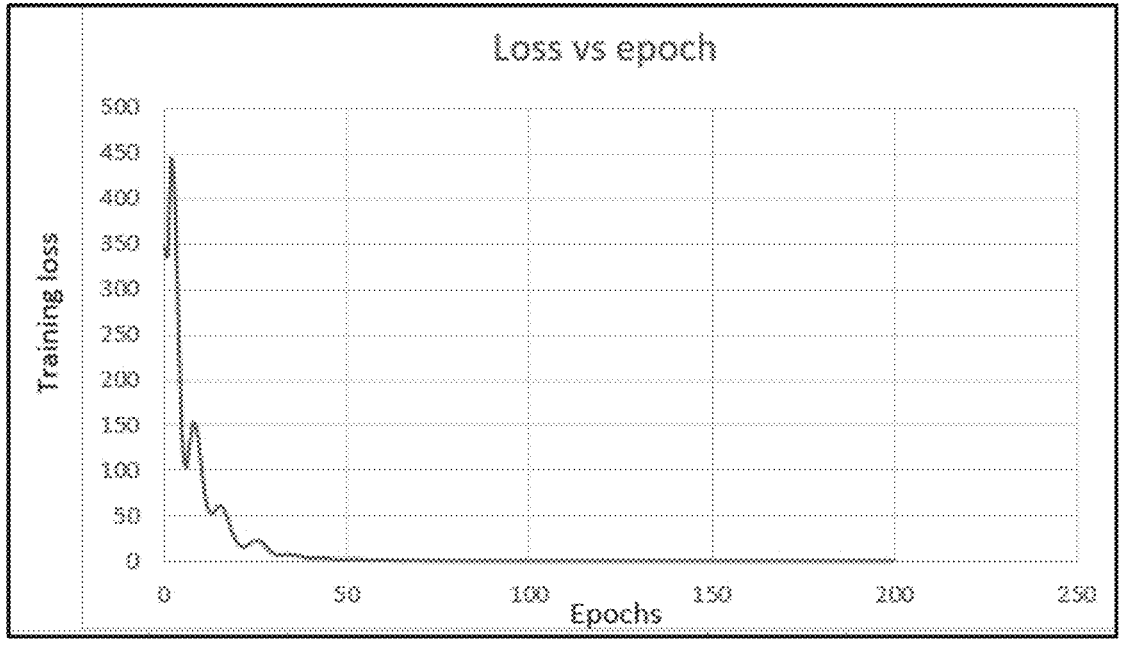
FIG. 7 depicts a graphical representation of training loss versus epochs (iterations), in accordance with an embodiment of the present disclosure.

In the present disclosure, complex loss function is used for training that takes into consideration permittivity as well as conductivity of the metamaterial. The calculation of loss is done using a function. The loss of the ring and non-ring region are found separately and added. Gradient function in TensorFlow is used for calculating the second order derivatives in loss equation. The loss evaluation is as per the above-mentioned expressions. The total loss is a complex term with real and imaginary part (e.g., refer component or expression portion including j which is a complex conjugate). Since the DNN (or PINN) can be trained only based on real numbers, the system 100 and method of the present disclosure calculate the absolute value of the total loss. FIG. 7, with reference to FIGS. 1 through 6, depicts a graphical representation of training loss versus epochs (iterations), in accordance with an embodiment of the present disclosure. The PINN (also referred as model and interchangeably used herein) is trained for 10000 iterations. The best model (weights and biases) that gives the lowest training loss is saved (also referred as optimized PINN having an optimized loss function). The training loss versus epoch is as shown in FIG. 7. The losses versus epochs for initial 200 epochs is shown for better understanding of the training embodiment depicting optimized loss function corresponding to the optimized PINN being obtained out of the training stage. Below Table 6 depicts exemplary epochs and training loss derived/inferred from training of the PINN.

TABLE 6

| Epoch | Training loss |
|---|---|
| 0 | 346.8566 |
| 1 | 336.6539 |
| 2 | 443.61655 |
| 3 | 398.55313 |
| 4 | 254.61914 |
| 5 | 134.90302 |

The lowest loss obtained is 9.854 E-5 which is considered as optimized loss function, in an embodiment of the present disclosure.

Figure 8:
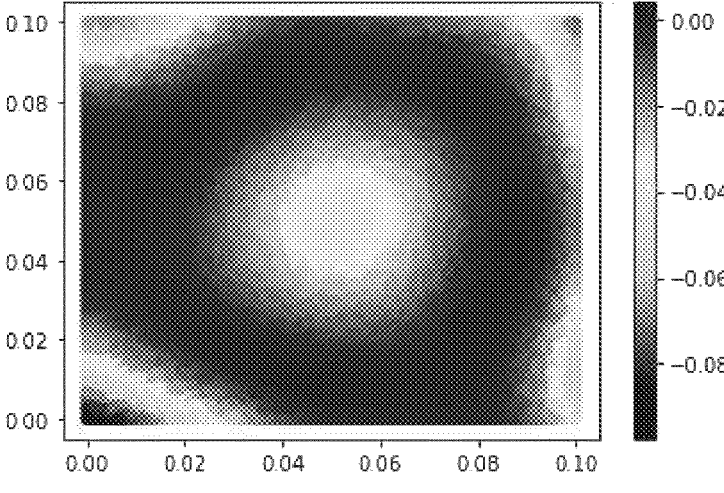
FIG. 8 depicts a predicted electric field profile E for the multi-dimensional metamaterial, in accordance with an embodiment of the present disclosure.

In an embodiment, at step 218 of the present disclosure, the one or more hardware processors 104 apply, via the optimized PINN, the optimized loss function on the plurality of surface coordinates of the multi-dimensional metamaterial to predict an electric field profile using associated weights and bias of the optimized Physics-Informed Neural Network (also referred as optimized PINN). The predicted electric field profile is obtained as the output of the trained PINN when surface coordinates are given as input after training. FIG. 8, with reference to FIGS. 1 through 7, depicts a predicted electric field profile for the multi-dimensional metamaterial, in accordance with an embodiment of the present disclosure.

Figure 9:
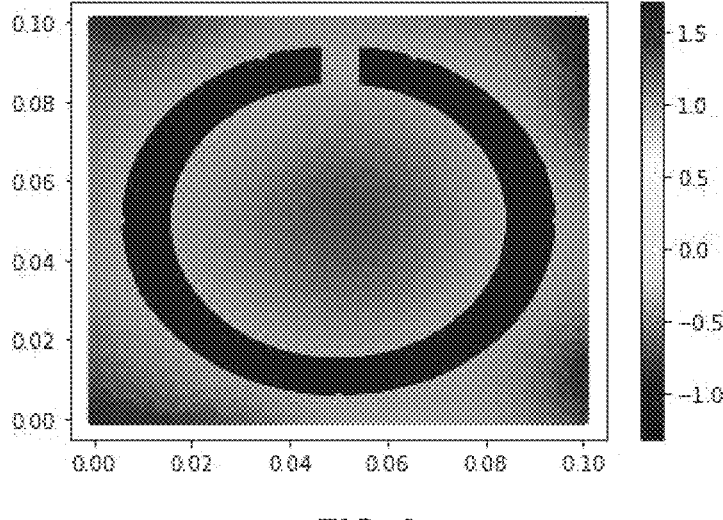
FIG. 9 depicts an effective electric permittivity at the plurality of surface coordinates being inversely calculated for the first region and the second region using the predicted electric field profile E and a Helmholtz equation, in accordance with an embodiment of the present disclosure.

In an embodiment, at step 220 of the present disclosure, the one or more hardware processors 104 inversely calculate one or more effective material properties at the plurality of surface coordinates for the first region and the second region using the predicted electric field profile and a Helmholtz equation. In an embodiment, the one or more effective material properties comprise an effective electric permittivity and/or an effective electric conductivity. The effective material property is found out by taking the average of all the points in ring and non-ring region separately, in an embodiment of the present disclosure. FIG. 9, with reference to FIGS. 1 through 8, depicts an effective electric permittivity at the plurality of surface coordinates being inversely calculated for the first region and the second region using the predicted electric field profile E and the Helmholtz equation, in accordance with an embodiment of the present disclosure.

In an embodiment, the effective electric permittivity is inversely calculated using the using the predicted electric field profile E and the Helmholtz equation for the first region (e.g., ring region $\Omega_2$) by way of following expression:

$$\varepsilon_r(x, y) = -[\nabla \times \nabla \times E(x, y) - jk_0\sigma(x, y)E(x, y)]/k_0^2 E(x, y)$$

In an embodiment, the effective electric permittivity is inversely calculated using the using the predicted electric field profile E and a Helmholtz equation for the second region (e.g., non-ring region $\Omega_1$) by way of following expression:

$$\varepsilon_r(x, y) = -(\nabla \times \nabla \times E(x, y))/k_0^2 E(x, y)$$

The method further comprises computing an average effective material property based on the one or more effecmaterial property (e.g., average effective electric permittivity) back to the COMSOL software tool for validation of the output generated by the optimized PINN. The simulation is redone with the new permittivity values and the electric field is obtained as shown for the actual resonant frequency (0.225 GHz), in an embodiment of the present disclosure.

Figure 10:
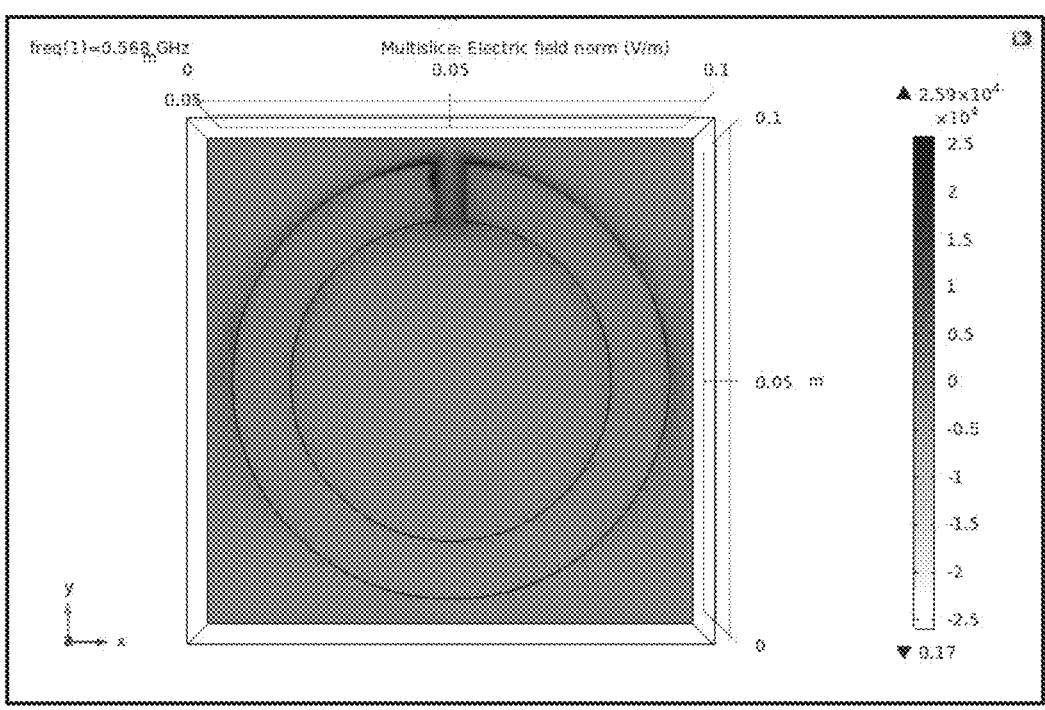
FIG. 10 depicts a simulated electric field profile obtained by simulating the average effective material property (e.g., the average electric permittivity), in accordance with an embodiment of the present disclosure.
Figure 11A:
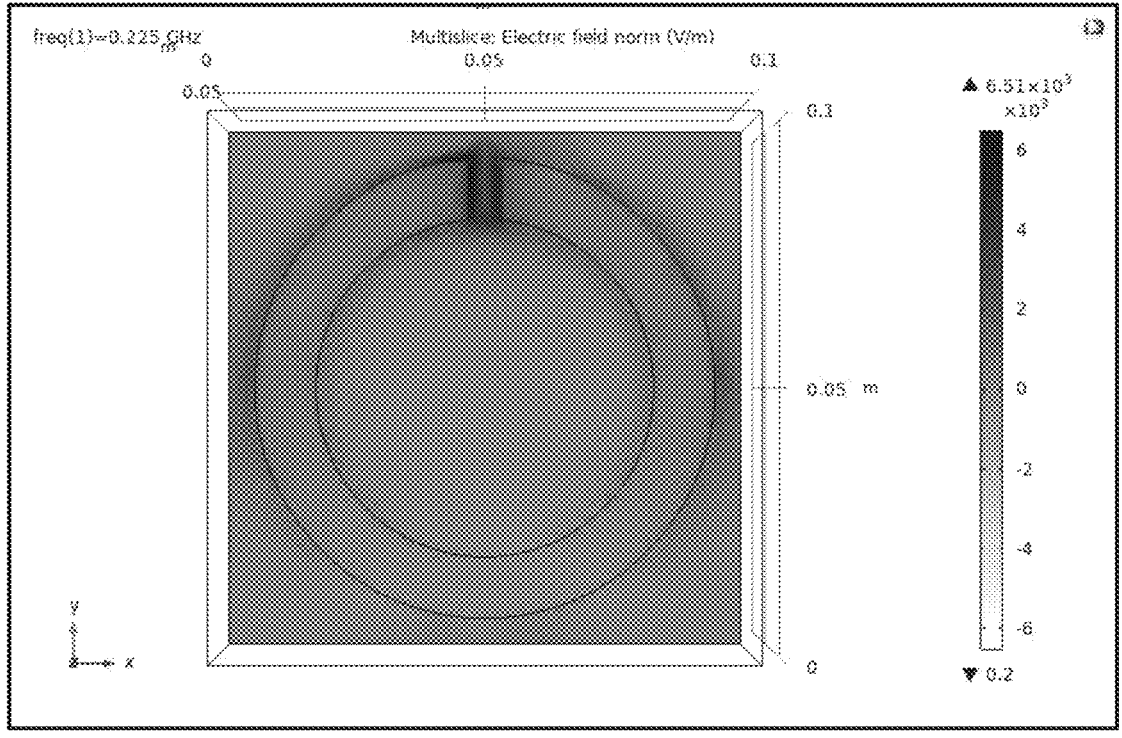
FIGS. 11A through 11C depict a comparison of (i) the simulated electric field profile, and (ii) the corresponding electric field profile, in accordance with an embodiment of the present disclosure.
Figure 11B:
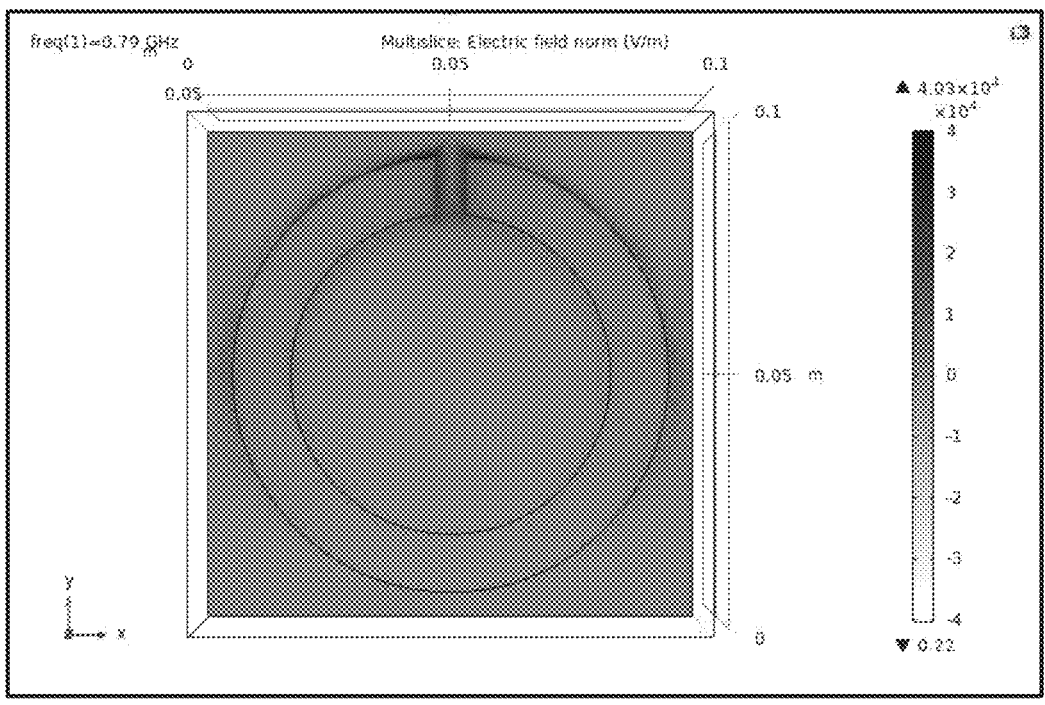
Figure 11C:
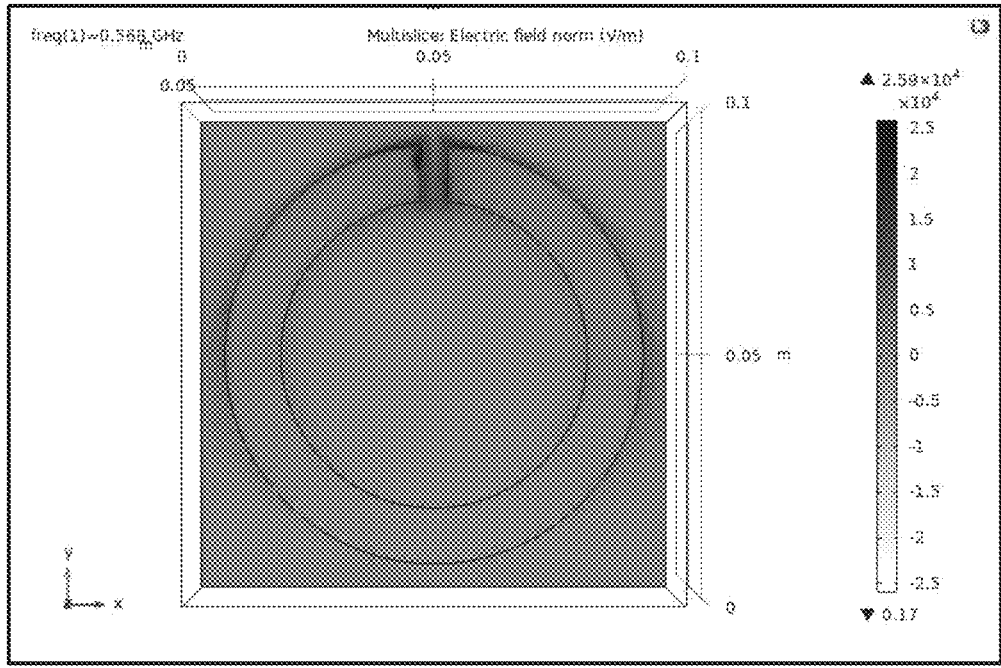
Figure 12A:
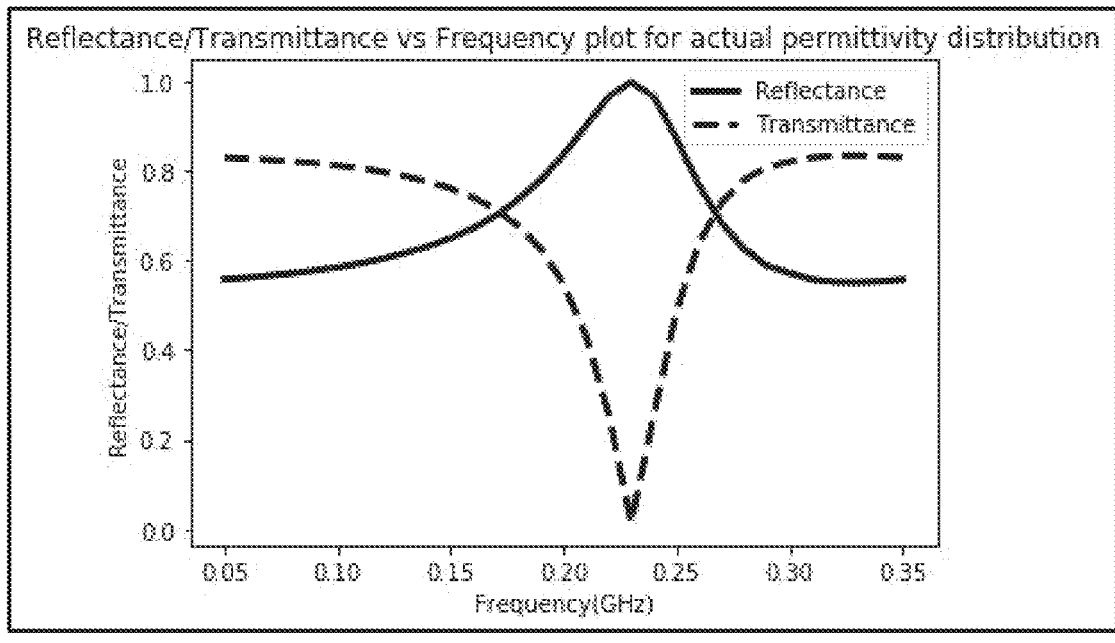
FIG. 12A depicts a graphical representation illustrating reflectance/transmittance versus frequency for actual electric permittivity distribution, in accordance with an embodiment of the present disclosure.
Figure 12B:
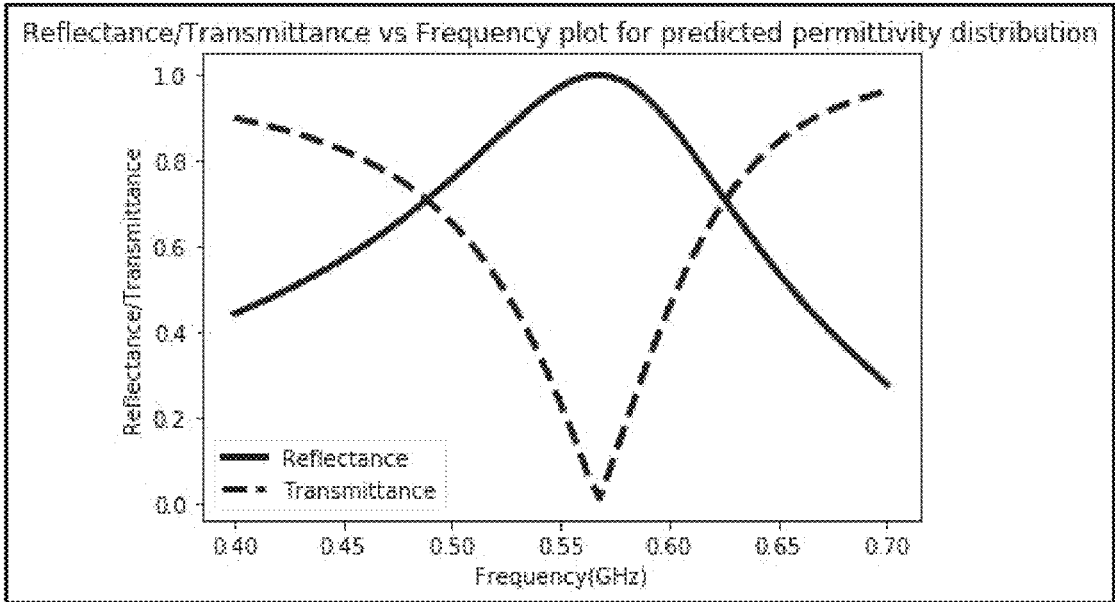
FIG. 12B depicts a graphical representation illustrating reflectance/transmittance versus frequency for actual electric permittivity distribution considering real loss function without electric conductivity, in accordance with an embodiment of the present disclosure.
Figure 12C:
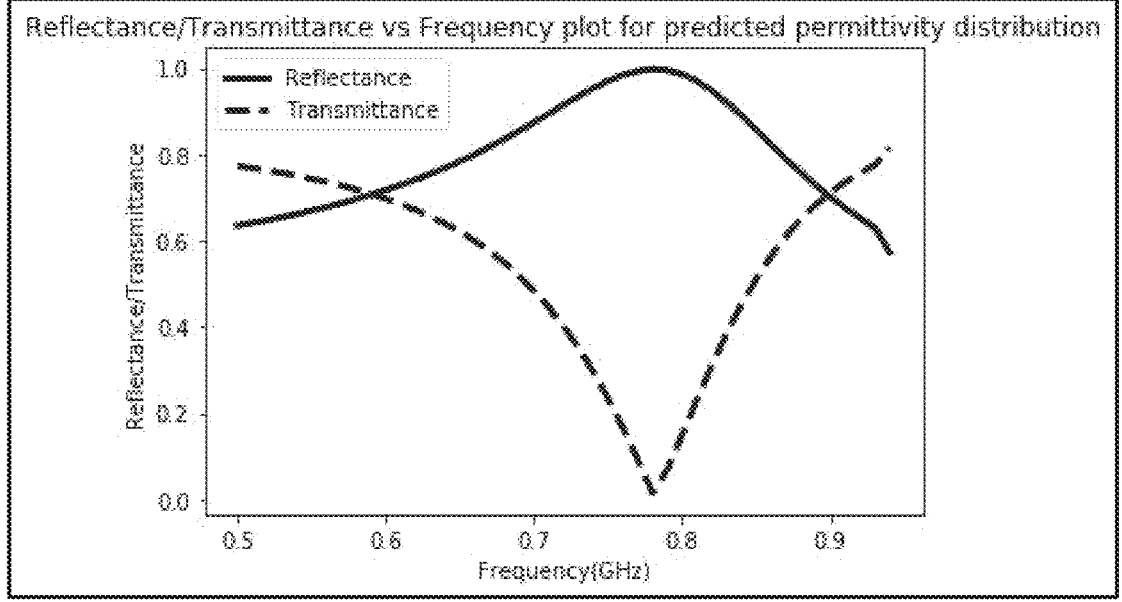
FIG. 12C depicts a graphical representation illustrating reflectance/transmittance versus frequency for actual electric permittivity distribution considering imaginary/complex loss function electric conductivity, in accordance with an embodiment of the present disclosure.

FIG. 10, with reference to FIGS. 1 through 9, depicts a simulated electric field profile obtained by simulating the average effective material property (e.g., the average electric permittivity), in accordance with an embodiment of the present disclosure. FIGS. 11A through 11C, with reference to FIGS. 1 through 10, depicts a comparison of (i) the simulated electric field profile, and (ii) the corresponding electric field profile, in accordance with an embodiment of the present disclosure. From FIG. 11A through 11C, it can be observed that there is a shift in resonant frequency which is due to the lower number of iterations of training. But, with the use of a complex loss function the resonant frequency starts converging to actual value compared to real loss function. FIGS. 12A through 12C, with reference to FIGS. 1 through 11C, depict validation of the simulated electric field profile based on the comparison of (i) the simulated electric field profile, and (ii) the corresponding electric field profile, in accordance with an embodiment of the present disclosure. More specifically, FIG. 12A depicts a graphical representation illustrating reflectance/transmittance versus frequency for actual electric permittivity distribution, in accordance with an embodiment of the present disclosure. FIG. 12B, with reference to FIGS. 1 through 12A, depicts a graphical representation illustrating reflectance/transmittance versus frequency for actual electric permittivity distribution considering real loss function without electric conductivity, in accordance with an embodiment of the present disclosure. FIG. 12C, with reference to FIGS. 1 through 12B, depicts a graphical representation illustrating reflectance/transmittance versus frequency for actual electric permittivity distribution considering imaginary/complex loss function electric conductivity, in accordance with an embodiment of the present disclosure. Table 7 depicts the comparison of (i) the simulated electric field profile, and (ii) the corresponding electric field profile for validating the simulated electric field profile:

TABLE 7

| Actual values | | Real loss function | | Imaginary/complex loss function | |
|---|---|---|---|---|---|
| Perm ring | 1 | Perm ring | −0.38769 | Perm ring | −1.31 |
| Perm substrate | 11.9 | Perm substrate | 0.09212 | Perm substrate | 1.14 |
| Resonance | 0.225 GHz | Resonance | 0.79 GHz | Resonance | 0.575 GHz | tive material properties calculated for the first region and the second region; simulating, via the finite element method-based wave simulation (FEMWS), the average effective material property to obtain a simulated electric field profile; performing a comparison of (i) the simulated electric field profile, and (ii) the corresponding electric field profile; and validating the simulated electric field profile based on the comparison. The above further comprising steps of computing, simulating, performing a comparison, and validating can be better understood by way of following description:

The system 100 and method takes the average of these permittivity values for ring and non-ring region (e.g., refer FIG. 9) to feed the averaged value of the average effective The above-mentioned steps may be better understood by way of following exemplary description:

The system 100 and method considered two distinct metamaterial unit cell structures for experiments; one is a 2D silicon disc (electric permittivity=11.9) surrounded by air (electric permittivity=1) and the other is an aluminium SRR on a silicon substrate (electric permittivity=11.9). The dimensional parameters are depicted in FIGS. The resonance frequency of the SRR is designed to be at 0.225 GHz for an incident wavelength of 1.33 m. The electric field profile was computed as a function of the metasurface's spatial coordinates (here, x, y, and z) using the Helmholtz wave equation in the frequency domain for linear, non-magnetic, weakly inhomogeneous materials, which is given by below equation/expression:

$$\nabla \times \nabla \times E(x, y, z) + k_0^2 \varepsilon_r(x, y, z)E(x, y, z) - jk_0\sigma(x, y, z)E(x, y, z) = 0$$

$k_0=5$ for both the disc as well as SRR. For the sake of brevity, other variables in the above expression as not defined (the same can be referred from earlier description). The physics-driven, mean squared error (MSE) loss function is expressed in terms of the residue of the Helmholtz equation and is computed as:

$$MSE = \frac{1}{N}\sum_{i=1}^{N}|F(x_i, y_i)|^2$$

As mentioned above, if 3 coordinates are obtained for the multi-dimensional metamaterial, then the above expression can be re-written to incorporate the z coordinate as below:

$$MSE = \frac{1}{N}\sum_{i=1}^{N}|F(x_i, y_i, z_i)|^2$$

wherein $$|F(x_i, y_i)|^2 = \nabla \times \nabla \times E(x, y) + k_0^2 \varepsilon_r(x, y)E(x, y) - jk_0\sigma(x, y)E(x, y)$$

The above expression(s) are used to train the PINN (or DNN) wherein the PINN is optimized generate an effective permittivity spatial profile that results in an electric field profile (E-field) that is identical to that of the original metasurface design. In the present disclosure, the system 100 implemented a fully connected feed-forward neural network, as shown in FIG. 6, with an input layer comprising of two neurons, namely, x, y, and normalized relative permittivity $\tilde{\varepsilon}_r$ defined as:

$$\tilde{\varepsilon}_r = \frac{\varepsilon_r - \varepsilon_{min}}{\varepsilon_{max} - \varepsilon_{min}}$$

This is followed by 4 hidden layers of 250 neurons each and an output layer with a single neuron for the predicted E-field distribution E(x, y). The input-output relationship of the network is denoted by E(x, y, θ) as a surrogate for the PDE solution to the Helmholtz equation, wherein θ is a vector containing the trainable weights and biases of the network. The intermediate layers were linearly shifted and scaled to [−1, 1] to prevent the PINN from overfitting. Tf.gradient function was used in Tensorflow 2.4.1 to calculate the partial derivative terms in expression $|F(x_i, y_i)|^2$. Further, the system used $\sigma_s=\sin(\pi.s)$ activation function, which was found to be most suitable for the chosen wavenumber ($k_0=5$). The system 100 further chose the Glorot optimization function for initializing the weights and biases and the learning rate was set to $10^{-4}$. As mentioned above, Adam optimizer was used to update the weights and biases to reduce the MSE. For both the disc as well as the SRR geometry, the model was run for 10,000 iterations (e.g., refer FIG. 7); the input data (spatial coordinates and $\tilde{\varepsilon}_r$) for the disc was 26,000 and for the SRR was 36,000 respectively. The system 100 evaluated the output E-fields profile from the optimized PINN by performing a full-wave simulation using a commercially available finite element method solver (COMSOL Multiphysics 5.6) on an Intel Core i7-9750H CPU, 2.6 GHz, 16 GB RAM.

Results and Discussion:

The predicted electric field profile is depicted in FIG. 8 for the disc and the SRR respectively. It was observed that the calculated electromagnetic (EM) response, which is based on the predicted $\varepsilon_r$, agrees well with the ground truth for the disc when imaginary part with conductivity in 1 is not taken into consideration. However, for the significantly more complex SRR, a discrepancy between the predicted and the actual electric field profile was observed when the imaginary part in 1 is ignored, which the system 100 attributes to the more significant impact of conductivity in SRR and shift in the resonance frequency for the predicted permittivities. FIGS. 12A through 12C show that the resonance frequency for the predicted structure shifts from the designed resonance at 0.225 GHz. However, on introduction of the imaginary terms with conductivity in loss calculation it has been observed that the resonance shifts more closer to actual value. With the introduction of a complex loss function it has been found that the resonance shift brings closer to actual resonance of 0.225 GHz. Therefore, this indicate that the accuracy of the PINN increases as the number of training iterations. The MSE achieved by optimizing the physics-driven loss for the disc was 57 and for the SRR was 276. The larger error for the SRR case can be explained by the highly sensitive dependence of the resonance phenomenon on the material properties ($\varepsilon_r$ in this case).

The system 100 and the method of the present disclosure used the PINN for retrieving the effective electric permittivity distributions of a simple disc-shaped metamaterial (or meta-atom) as well as a complex, circular split-ring resonant geometry. The loss function of the feed forward neural network's (PINN's) is formulated using the Helmholtz wave equation (derived from Maxwell's equations as known in the art), which governs electromagnetic wave propagation in any medium. The electric field profile generated by the PINN (based on the predicted permittivity distribution) has been compared with the ground truth data generated using a commercial EM solver wherein the electric permittivity values are discretely defined. It has been observed that for relatively simple structures such as the disc, 10000 training iterations are sufficient for demonstrating spectral performance but for a split-ring geometry, where the resonant behavior depends sensitively on material properties, the PINN should ideally be run for higher number of training iterations to accurately capture the spatial profile of its material properties.

The development of simplified, data-driven design methods that avoid tedious, computationally intensive calculations, significantly contribute towards increasing penetration of metamaterials into applications that impact daily lives, either as end-user devices or an integral component(s) in high-tech assemblies. A primary outcome of the PINN is the simplification of the network training process via a reduction in the number of curated training dataset unlike conventional machine learning approaches. In the present disclosure, system 100 and the method 200 do not require electric field profile data to converge to a solution but rely solely on the physics-driven loss (or loss function of the PINN) to depict a metamaterial's spectral response. It is to be understood by a person having ordinary skill in the art or person skilled in the art that above-mentioned techniques and networks are implemented by the system 100 and the method 200 shall not be construed as limiting the scope of the present disclosure and any similar technique(s) and/or networks may be implemented herein as feasible.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for physics-informed neural network (PINN) for inversely predicting effective material properties of metamaterials, comprising:

obtaining, via one or more hardware processors, an input comprising a plurality of surface coordinates corresponding to a multi-dimensional metamaterial with meta-atom designs of a disc and a split-ring resonator (SRR);

performing, via the one or more hardware processors, a finite element method-based wave simulation (FEMWS) on the plurality of surface coordinates associated with the multi-dimensional metamaterial to obtain a corresponding electric field profile;

segregating, via the one or more hardware processors, the plurality of surface coordinates associated with the multi-dimensional metamaterial and the corresponding electric field profile into a first region and a second region to obtain a first region-based data and a second region-based data, wherein the first region is a ring region of the multi-dimensional metamaterial and the second region is a non-ring region of the multi-dimensional metamaterial;

obtaining, via the one or more hardware processors, one or more material properties comprising (i) an electric permittivity, (ii) an electric conductivity, and a wave number for each of the first region-based data and the second region-based data;

normalizing, via the one or more hardware processors, the electric permittivity, the electric conductivity, the first region-based data, and the second region-based data to obtain a first set of normalized data and a second set of normalized data;

creating, via the one or more hardware processors, the Physics-Informed Neural Network (PINN) based on the first set of normalized data and the second set of normalized data for homogenizing the disc and the SRR;

computing, via the one or more hardware processors, a loss function corresponding to the created PINN for each of the first region and the second region using the first set of normalized data and the second set of normalized data and the wave number, wherein the loss function for the first region is computed using an expression:

$$\nabla \times \nabla \times E(x, y) + k_0^2 \varepsilon_r(x, y) E(x, y) - j k_0 \sigma(x, y) E(x, y) = 0,$$

and wherein E is the corresponding electric field profile, x and y are the plurality of surface coordinates, $k_0$ is the wave number, $\varepsilon_r$ is the electric permittivity, $\sigma$ is the electric conductivity, and j is a complex conjugate, wherein when three coordinates are obtained for the multi-dimensional metamaterial, then the expression is re-written to incorporate the z coordinate as:

$$\nabla \times \nabla \times E(x, y, z) + k_0^2 \varepsilon_r(x, y, z) E(x, y, z) = 0,$$

wherein the loss function for the second region is computed using an expression:

$$\nabla \times \nabla \times E(x, y) + k_0^2 \varepsilon_r(x, y) E(x, y) = 0$$

and wherein E is the corresponding electric field profile, x and y are the plurality of surface coordinates, $k_0$ is the wave number, $\varepsilon_r$ is the electric permittivity, and $\sigma$ is the electric conductivity for the plurality of surface coordinates x and y, wherein when three coordinates are obtained for the multi-dimensional metamaterial, then the expression is re-written to incorporate the z coordinate as:

$$\nabla \times \nabla \times E(x, y, z) + k_0^2 \varepsilon_r(x, y, z) E(x, y, z) = 0;$$

iteratively training, via the one or more hardware processors, the PINN using the loss function computed for each of the first region and the second region until an optimized PINN is obtained, wherein the optimized PINN comprises an optimized loss function;

applying, via the optimized PINN, the optimized loss function on the plurality of surface coordinates of the multi-dimensional metamaterial to predict an electric field profile using associated weights and bias of the optimized PINN;

inversely calculating, via the one or more hardware processors, one or more effective material properties at the plurality of surface coordinates for the first region and the second region using the predicted electric field profile and a Helmholtz equation;

computing a first average effective material property based on the one or more effective material properties calculated for the ring region and the non-ring region;

simulating, via the finite element method-based wave simulation (FEMWS), the first average effective material property to obtain a first simulated electric field profile;

performing a comparison of (i) the first simulated electric field profile, and (ii) the corresponding electric field profile;

validating the first simulated electric field profile based on the comparison;

computing a second average of effective material property based on the one or more effective material properties calculated for the ring region and the non-ring region;

feeding back the second average of effective material property to a software tool for validating an output generated by the optimized PINN; and re-simulating the first average effective material property with the effective material property and obtaining a second simulated electric field profile for a resonant frequency.

2. The processor implemented method of claim 1, wherein the first region and the second region are different from each other.

3. The processor implemented method of claim 1, wherein the plurality of surface coordinates obtained from the first set of normalized data and the second set of normalized data serves as one or more inputs corresponding to one or more input layers of the PINN, and wherein the corresponding electric field from the first set of normalized data and the second set of normalized data serves as an output corresponding to an output layer of the PINN.

4. The processor implemented method of claim 1, wherein the one or more effective material properties comprise at least one of an effective electric permittivity and an effective electric conductivity.

5. A system for physics-informed neural network for inversely predicting effective material properties of metamaterials, comprising:

a memory storing instructions;

one or more communication interfaces; and one or more hardware processors coupled to the memory via the one or more communication interfaces, wherein the one or more hardware processors are configured by the instructions to:

obtain an input comprising a plurality of surface coordinates corresponding to a multi-dimensional metamaterial with meta-atom designs of a disc and a split-ring resonator (SRR);

perform a finite element method-based wave simulation (FEMWS) on the plurality of surface coordinates associated with the multi-dimensional metamaterial to obtain a corresponding electric field profile;

segregate the plurality of surface coordinates associated with the multi-dimensional metamaterial and the corresponding simulated electric field profile into a first region and a second region to obtain a first region-based data and a second region-based data, wherein the first region is a ring region of the multi-dimensional metamaterial and the second region is a non-ring region of the multi-dimensional metamaterial;

obtain one or more material properties comprising (i) an electric permittivity, (ii) an electric conductivity, and a wave number for each of the first region-based data and the second region-based data;

normalize the electric permittivity, the electric conductivity, the first region-based data, and the second region-based data to obtain a first set of normalized data and a second set of normalized data;

create the Physics-Informed Neural Network (PINN) based on the first set of normalized data and the second set of normalized data for homogenizing the disc and the SRR;

compute a loss function corresponding to the created PINN for each of the first region and the second region using the first set of normalized data and a second set of normalized data and the wave number, wherein the loss function for the first region is computed using an expression:

$$\nabla \times \nabla \times E(x, y) + k_0^2 \varepsilon_r(x, y) E(x, y) - jk_0 \sigma(x, y) E(x, y) = 0,$$

and wherein E is the corresponding electric field profile, x and y are the plurality of surface coordinates, $k_0$ is the wave number, $\varepsilon_r$ is the electric permittivity, $\sigma$ is the electric conductivity, and j is a complex conjugate, wherein when three coordinates are obtained for the multi-dimensional metamaterial, then the expression is re-written to incorporate the z coordinate as:

$$\nabla \times \nabla \times E(x, y, z) + k_0^2 \varepsilon_r(x, y, z)E(x, y, z) = 0,$$

wherein the loss function for the second region is computed using an expression:

$$\nabla \times \nabla \times E(x, y) + k_0^2 \varepsilon_r(x, y)E(x, y) = 0$$

and wherein E is the corresponding electric field profile, x and y are the plurality of surface coordinates, $k_0$ is the wave number, $\varepsilon_r$ is the electric permittivity, and $\sigma$ is the electric conductivity for the plurality of surface coordinates x and y, wherein when three coordinates are obtained for the multi-dimensional metamaterial, then the expression is re-written to incorporate the z coordinate as:

$$\nabla \times \nabla \times E(x, y, z) + k_0^2 \varepsilon_r(x, y, z)E(x, y, z) = 0;$$

iteratively train the PINN using the loss function computed for each of the first region and the second region until an optimized PINN is obtained, wherein the optimized PINN comprises an optimized loss function;
apply, via the optimized PINN, the optimized loss function on the plurality of surface coordinates of the multi-dimensional metamaterial to predict an electric field profile using associated weights and bias of the optimized PINN;
inversely calculate one or more effective material properties at the plurality of surface coordinates for the first region and the second region using the predicted electric field profile and a Helmholtz equation;
compute a first average effective material property based on the one or more effective material properties calculated for the ring region and the non-ring region;
simulate, via the finite element method-based wave simulation (FEMWS), the first average effective material property to obtain a first simulated electric field profile;
perform a comparison of (i) the first simulated electric field profile, and (ii) the corresponding electric field profile;
validate the first simulated electric field profile based on the comparison;
compute a second average of effective material property based on the one or more effective material properties calculated for the ring region and the non-ring region;
feedback the second average of effective material property to a software tool for validating an output generated by the optimized PINN; and
re-simulate the first average effective material property with the effective material property and obtain a second simulated electric field profile for a resonant frequency.
6. The system of claim 5, wherein the first region and the second region are different from each other.
7. The system of claim 5, wherein the plurality of surface coordinates obtained from the first set of normalized data and the second set of normalized data serves as one or more inputs corresponding to one or more input layers of the PINN, and wherein the corresponding electric field from the first set of normalized data and the second set of normalized data serves as an output corresponding to an output layer of the PINN.
8. The system of claim 5, wherein the one or more effective material properties comprise at least one of an effective electric permittivity and an effective electric conductivity.
9. One or more non-transitory machine-readable information storage mediums comprising one or more instructions which when executed by one or more hardware processors cause:
obtaining an input comprising a plurality of surface coordinates corresponding to a multi-dimensional metamaterial with meta-atom designs of a disc and a split-ring resonator (SRR);
performing a finite element method-based wave simulation (FEMWS) on the plurality of surface coordinates associated with the multi-dimensional metamaterial to obtain a corresponding electric field profile;
segregating the plurality of surface coordinates associated with the multi-dimensional metamaterial and the corresponding electric field profile into a first region and a second region to obtain a first region-based data and a second region-based data, wherein the first region is a ring region of the multi-dimensional metamaterial and the second region is a non-ring region of the multi-dimensional metamaterial;
obtaining one or more material properties comprising (i) an electric permittivity, (ii) an electric conductivity, and a wave number for each of the first region-based data and the second region-based data;
normalizing the electric permittivity, the electric conductivity, the first region-based data, and the second region-based data to obtain a first set of normalized data and a second set of normalized data;
creating the Physics-Informed Neural Network (PINN) based on the first set of normalized data and the second set of normalized data for homogenizing the disc and the SRR;
computing a loss function corresponding to the created PINN for each of the first region and the second region using the first set of normalized data and the second set of normalized data and the wave number, wherein the loss function for the first region is computed using an expression:

$$\nabla \times \nabla \times E(x, y) + k_0^2 \varepsilon_r(x, y)E(x, y) - jk_0\sigma(x, y)E(x, y) = 0,$$

and wherein E is the corresponding electric field profile, x and y are the plurality of surface coordinates, $k_0$ is the wave number, $\varepsilon_r$ is the electric permittivity, $\sigma$ is the electric conductivity, and j is a complex conjugate, wherein when three coordinates are obtained for the multi-dimensional metamaterial, then the expression is re-written to incorporate the z coordinate as:

$$\nabla \times \nabla \times E(x, y, z) + k_0^2 \varepsilon_r(x, y, z)E(x, y, z) = 0,$$

wherein the loss function for the second region is computed using an expression:

$$\nabla \times \nabla \times E(x, y) + k_0^2 \varepsilon_r(x, y)E(x, y) = 0$$

and wherein E is the corresponding electric field profile, x and y are the plurality of surface coordinates, $k_0$ is the wave number, $\varepsilon_r$ is the electric permittivity, and $\sigma$ is the electric conductivity for the plurality of surface coordinates x and y, wherein when three coordinates are obtained for the multi-dimensional metamaterial, then the expression is re-written to incorporate the z coordinate as:

$$\nabla \times \nabla \times E(x,\, y,\, z) + k_0^2 \varepsilon_r(x,\, y,\, z) E(x,\, y,\, z) = 0;$$

iteratively training the PINN using the loss function computed for each of the first region and the second region until an optimized PINN is obtained, wherein the optimized PINN comprises an optimized loss function;

applying, via the optimized PINN, the optimized loss function on the plurality of surface coordinates of the multi-dimensional metamaterial to predict an electric field profile using associated weights and bias of the optimized PINN; and inversely calculating one or more effective material properties at the plurality of surface coordinates for the first region and the second region using the predicted electric field profile and a Helmholtz equation;

computing a first average effective material property based on the one or more effective material properties calculated for the ring region and the non-ring region;

simulating, via the finite element method-based wave simulation (FEMWS), the first average effective material property to obtain a first simulated electric field profile;

performing a comparison of (i) the first simulated electric field profile, and (ii) the corresponding electric field profile;

validating the first simulated electric field profile based on the comparison;

computing a second average of effective material property based on the one or more effective material properties calculated for the ring region and the non-ring region;

feeding back the second average of effective material property to a software tool for validating an output generated by the optimized PINN; and re-simulating the first average effective material property with the effective material property and obtaining a second simulated electric field profile for a resonant frequency.

10. The one or more non-transitory machine-readable information storage mediums of claim 9, wherein the first region and the second region are different from each other.

11. The one or more non-transitory machine-readable information storage mediums of claim 9, wherein the plurality of surface coordinates obtained from the first set of normalized data and the second set of normalized data serves as one or more inputs corresponding to one or more input layers of the PINN, and wherein the corresponding electric field from the first set of normalized data and the second set of normalized data serves as an output corresponding to an output layer of the PINN.

12. The one or more non-transitory machine-readable information storage mediums of claim 9, wherein the one or more effective material properties comprise at least one of an effective electric permittivity and an effective electric conductivity.

\* \* \* \* \*